J. V. Tilton,
Dressing Millstones.
Nº 8,458.      Patented Oct. 21, 1851.
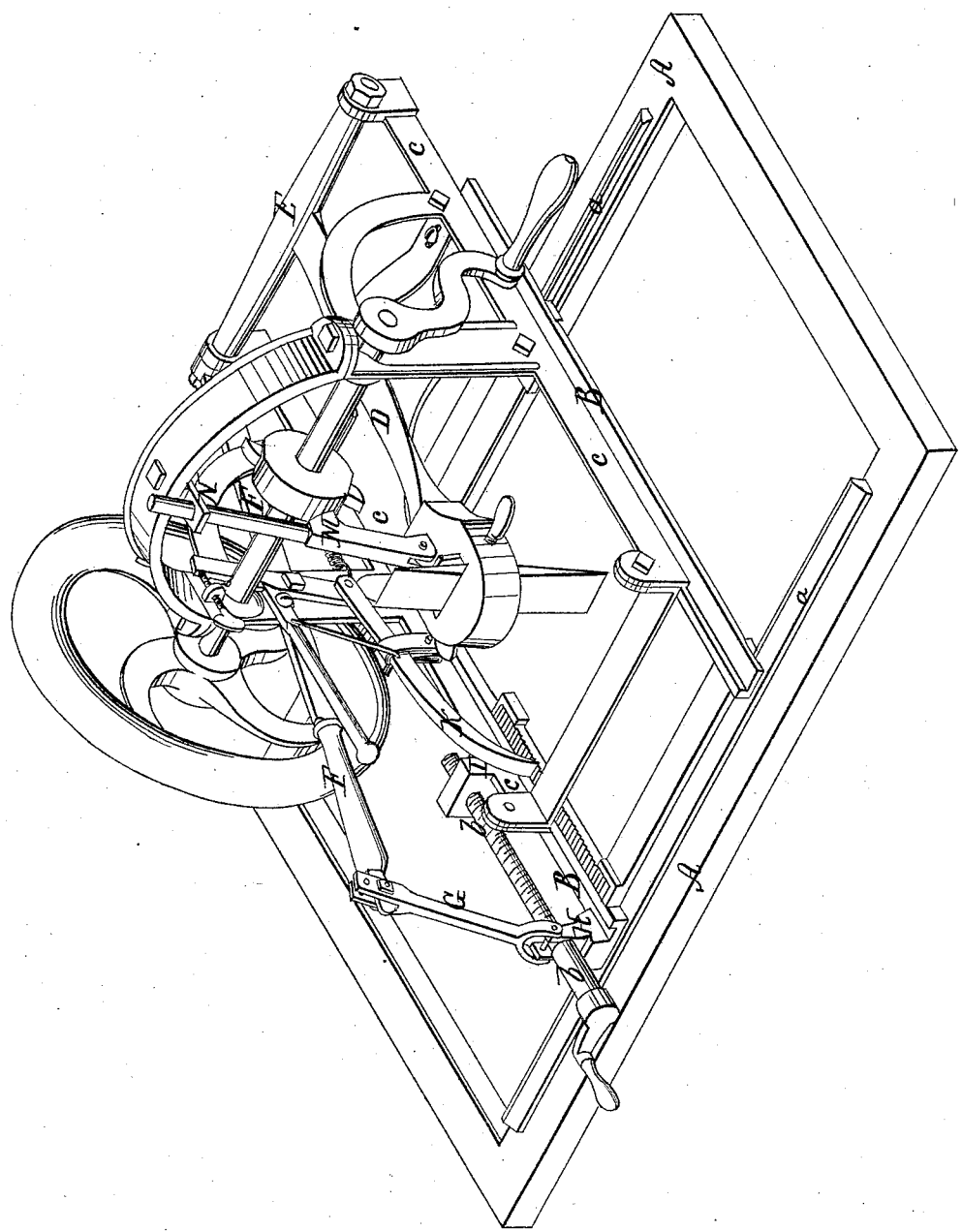

UNITED STATES PATENT OFFICE.

JOSEPH V. TILTON, OF MARCELLUS, NEW YORK.

MACHINE FOR DRESSING STONE.

Specification of Letters Patent No. 8,458, dated October 21, 1851.

*To all whom it may concern:*

Be it known that I, JOSEPH V. TILTON, of Marcellus, in the county of Onondaga and State of New York, have invented certain new and useful Improvements in Machinery for Picking and Dressing Mill and other Descriptions of Stones, and that the following is a full, clear, and exact description of the principle or character which distinguishes it from all other things before known and of the usual manner of making, modifying, and using the same, reference being had to the accompanying drawing, and letters marked thereon, forming a part of this specification.

The nature of my invention consists in hanging or suspending the ordinary pick used by hand in a stock or pick-head, so as to give the desired whip and spring blow precisely in the manner as when by hand. The pick-head in which the pick is placed is firmly attached to a flexible steel spring, which is raised by cam or other suitable action, and in falling is acted upon by a bow-spring placed on the frame of the carriage. And a further improvement consists in the manner of adjusting the action of the pick for varying the depth or strength of the blow, so as to graduate the furrow of mill-stones from the deepest part to the feather edge.

In the accompanying drawing, which is an isometrical view, A, A, is the platform or frame, on which are rails or ways (*a, a*). B, B, the carriage which slides on the rails (*a, a,*) in one direction, and (*c, c,*) the upper carriage to which the pick-head and spring are attached, sliding on ways at right angles to the carriage B, B, so that the pick can be brought to act on any part of the surface of the stone. D, the spring and pick head firmly attached to a shaft E, having its bearings on the upper carriage frame (*c, c,*); to the end of this shaft is firmly attached a lever F, which, when the surface of the stone is being dressed, or "cracked," it is raised or lowered by the hand, so as to vary the depth or strength of the blow; but when cutting the furrow of mill-stones, the lever F is geared to a connecting rod or lever G, jointed to a bracket H, on the lower carriage; and through this bracket passes a crank-screw rod (*b*), working in a female screw in the bracket I, on the upper carriage frame, which is for the purpose of advancing the upper carriage frame gradually, as desired, so as to cut the furrow from the deep part gradually tapering to the feather erge, K, the ratchet, falling into a rack on the lower carriage frame, and the axle on which the cams are attached, is provided with smaller cams for operating upon the pawl and ratchet, so as to advance the carriage at each blow of the pick one tooth on the rack. This motion is to be used when facing or "cracking" the stone in parallel lines, and can be accomplished by the arrangement represented in the drawing, or by any other analogous manner.

The pick used in my machine is the ordinary one used by hand, and can be passed through a mortise in the pick head, and secured by a screw, so as to admit of its being shifted from end to end, or in any other convenient manner. The cams on the main shaft, two or more, operate upon a vertical pitman M, which is jointed to the pick-head, and working through a guide N, on the arch frame piece, so as to allow a free and unrestrained motion to the spring and pick, both in its upward and downward action.

Operation: The machine is placed on the stone to be dressed, and the first operation, which is "cracking," the lever F, is disconnected from the short lever G, which allows the upper carriage to move unrestrained by the action of the pawl and ratchet, cracking or picking the stone in parallel lines. When dressing or smoothing down the inequalities on the surface of the stone, the ratchet can be raised above the rack, and the depth or strength of the blow is regulated by pressing or raising the lever F, by hand, so as to strike light or heavy with the pick, as desired. When cutting the furrows of mill stones, the lever G is connected with the lever F, and the crank or regulating screw is screwed in and out, so that the action of the pick in the furrow can be regulated, giving a heavy blow at the start to a nicety, forming the deepest part of the furrow, and by graduating the screw, the strength of the blow is gradually decreased as the pick approaches the feather edge of the furrow.

Having thus fully described the construction and operation of my machine, what I claim therein as new, and desire to secure by Letters Patent, is—

1. The manner of attaching the pick head to a strong but flexible steel spring, which falls on a box spring, whereby the desirable whip or spring blow is given to the pick, substantially as described.

2. I also claim the combination of the lever F, and connecting lever G, and crank screw for graduating the action of the pick while cutting the furrow of mill stones, gradually decreasing the force of the blow as the pick approaches the feather edge of the furrow, substantially as described and represented.

JOSEPH V. TILTON.

Witnesses:
  WM. GREENOUGH,
  J. BECKWITH WEST.